United States Patent [19]

Cerceau

[11] Patent Number: 5,057,124
[45] Date of Patent: Oct. 15, 1991

[54] COMPOSITE ABRASIVE PRODUCT COMPRISING AN ACTIVE PART OF ULTRA-HARD MATERIAL AND METHOD OF MANUFACTURING SUCH A PRODUCT

[75] Inventor: Jean-Michel Cerceau, Seyssinet, France

[73] Assignee: Societe Industrielle de Combustible Nucleaire, Annecy, France

[21] Appl. No.: 425,333

[22] Filed: Oct. 23, 1989

[30] Foreign Application Priority Data

Nov. 3, 1988 [FR] France .................. 88 14335

[51] Int. Cl.$^5$ .............................................. B24D 3/00
[52] U.S. Cl. .......................................... 51/293; 51/295; 51/309
[58] Field of Search ........................ 51/293, 295, 309

[56] References Cited

U.S. PATENT DOCUMENTS

| | | | |
|---|---|---|---|
| 4,215,999 | 8/1980 | Phaal | 51/295 |
| 4,225,322 | 9/1980 | Knemeyer | 51/295 |
| 4,255,165 | 3/1981 | Dennis et al. | 51/309 |
| 4,268,276 | 5/1981 | Bovenkerk | 51/295 |
| 4,604,106 | 8/1986 | Hall et al. | 51/293 |
| 4,789,385 | 12/1988 | Dyer et al. | 51/293 |
| 4,817,341 | 4/1989 | Umeda | 51/293 |
| 4,824,442 | 4/1989 | Cerceau | 51/309 |
| 4,850,523 | 7/1989 | Slutz | 51/295 |
| 4,871,377 | 10/1989 | Frushour | 51/309 |

FOREIGN PATENT DOCUMENTS 0019467  8/1982  European Pat. Off. .
0081775  6/1983  European Pat. Off. .

Primary Examiner—William R. Dixon, Jr.
Assistant Examiner—Willie J. Thompson
Attorney, Agent, or Firm—Larson and Taylor

[57] ABSTRACT

A composite abrasive product comprises a refractory carbide support and a ring-shaped compact having a rotational symmetry about an axis of the support. The compact has an axial thickness which is small as compared with the axial thickness of the support and a substantially triangular axial cross-section, said compact having a face metallurgically bonded to a chamfered circumferential part of the support and the two remaining faces joining at a cutting edge. A method for manufacturing such a product is also disclosed.

13 Claims, 1 Drawing Sheet

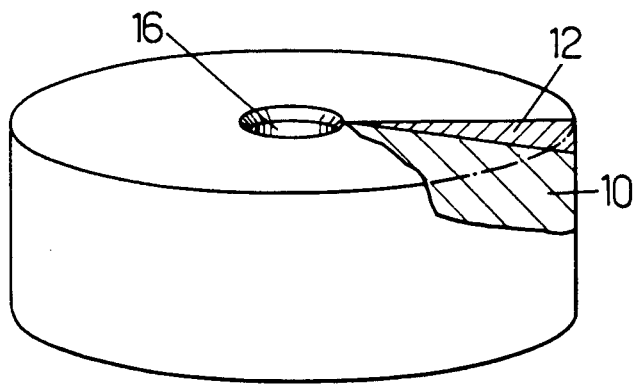
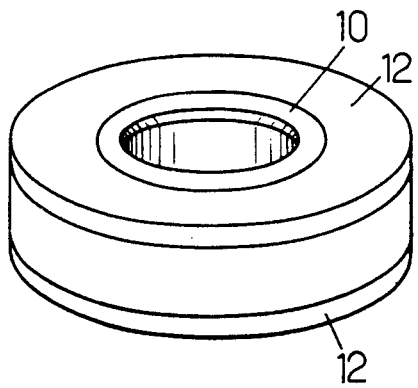
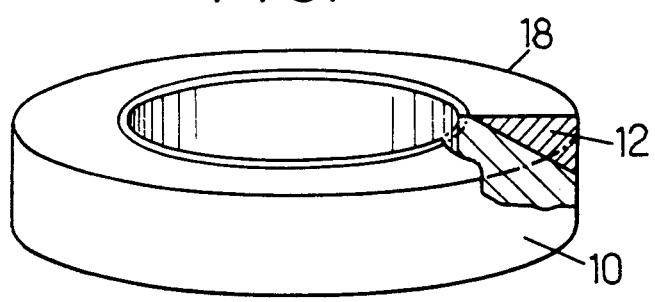
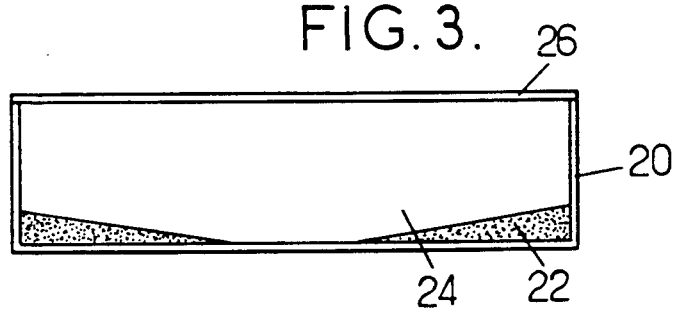
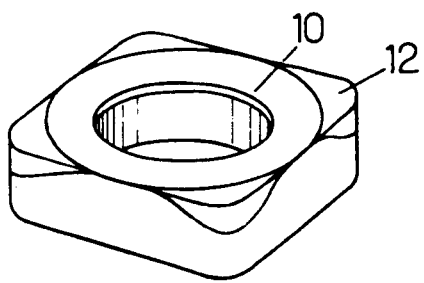
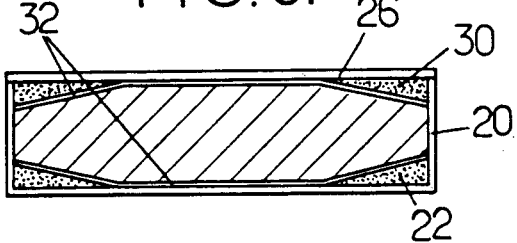

COMPOSITE ABRASIVE PRODUCT COMPRISING AN ACTIVE PART OF ULTRA-HARD MATERIAL AND METHOD OF MANUFACTURING SUCH A PRODUCT

BACKGROUND OF THE INVENTION

1. Field of the Invention

The invention relates to composite abrasive products or elements comprising an active part formed by a "compact" having a polycrystalline structure and containing grains of ultra-hard material bonded directly together and a hard and refractory carbide support having a metallurgical bond with the compact.

The term "compact" designates a cemented product formed by grains bonded together by bridges created by diffusion of material in plastic condition.

2. Prior Art

Composite cutting products of the above-defined type are already known in which the compact covers the whole of one face of the support or forms an embedded cutting edge (French Patent No. 2,089,415).

Products are also known formed of an annular compact of ultra-hard material (polycrystalline diamond or cubic boron nitride) carried by a face of a carbide support which is also annular (British Patent No. 1,473,664).

Finally, products are known in which the compact, in the form of a ring, is fixed by brazing or clamping in an annular recess of the support, this recess being defined by a surface perpendicular to the axis of the ring and by an internal surface parallel to the axis (European Patent No. 0,019,467).

According to European Patent No. 0,019,467, this arrangement is supposed to have the advantage of reducing the cost of the composite product by a rational use of the abrasive part, limited to a narrow useful peripheral zone extending along the cutting edge. It is true that this arrangement makes it possible to cut out, from the same starting compact, several concentric strips having the same shape and different diameters and locate them on different products by brazing or mechanical fixing. As in the case of the product defined in British Patent No. 1,473,664, advantage is taken of the fact that a composite product consisting of a layer of ultra-hard material is in fact only used along a peripheral strip along the cutting edge. The ultra-hard compact is however not fixed to its support by a metallurgical bond, which means that all the advantages provided by such a bond are lost.

It is impossible to form a true composite product (i.e. in which the compact is manufactured on the support itself and has a metallurgical bond therewith) when the annular compact occupies a recess of the support whose cross-section has a sharp angle. The reason is that the shrinkage of the compact during high temperature and high pressure sintering of a composite would create stresses causing cracking during cooling after sintering and during use of the product, under the effect of the thermal or mechanical stresses which then appear.

SUMMARY OF THE INVENTION

An object of the invention is to provide a composite abrasive product whose compact is annular, answering better than those known heretofore to the requirements of practice, particularly in that it makes it possible both to overcome the risk of breakage caused by the thermal stresses at the interface and to reduce the mass of ultra-hard material to a minimum.

For that purpose, the invention provides a composite abrasive product whose compact is in the form of a ring having a small axial thickness as compared to that of the support, with a cross-section approximately in the form of a triangle, generally elongated radially, one of the faces of the compact having a metallurgical bond with a chamfered circumferential portion of the support and the other faces ending in the cutting edge.

The dimensions of the chamfer and those of the compound are advantageously proportioned so that the composite has a flat surface perpendicular to the axis of the annular compact.

The term "annular" used above should not be interpreted as meaning that the compact has necessarily the shape of a complete ring. While, in most cases, particularly when the product has a shape of revolution, the compact effectively represents a complete ring, it may be otherwise, especially when the product has a prismatic shape. Then, the compact may be split up into several portions representing fractions of the ring, occupying the projecting portions of a prism.

Whatever the embodiment used, the presence of a single oblique surface, rather than two mutually orthogonal surfaces which create stress concentration zones, makes it possible to absorb the latter at a point such as to make it possible to secure the composite product by brazing and to use it without difficulty as a tool under heat producing conditions.

The angle between the surface of the product having the cutting edge and the face of the compact having a metallurgical bond (i.e. the interface between the polycrystalline compact and support) depends on the use. It is generally of from 3° to 45°. It is optimized as a function of the thickness of the ultra-hard compact desired and of the width of the useful peripheral band. This useful band varies depending on the application: on a product intended for machining, it is relatively narrow while, on a product forming a drilling insert, it is much wider.

Since the compact is annular, it is possible to make a composite product formed with a central connection hole without difficulty. In fact, it is sufficient to give the ring radial dimensions such that the hole to be formed does not extend onto the ultra-hard material compact.

Such a central hole is often extremely useful for passing a mechanical connection element therethrough on a tool holder (for example on a machining or cutting machine) or to accomodate a flow of cooling fluid, in the case of use for drilling. Machining the hole in the metal carbide support (tungstene carbide in general) presents no difficulty: it may be achieved by electroerosion. On the other hand, it is difficult to machine a hole through the whole of a compact and of the support of a composite abrasive product, since the abrasive product made from a ultra-hard product is a poor electric conductor and lends badly to electro-erosion cutting and the support is damaged in the case of laser cutting, suitable for the compact.

The invention also provides a method of manufacturing a composite abrasive product of the above-defined kind, in which: an annular layer of powder of the product intended to form the abrasive compact is placed on the periphery of the bottom of a cup and the layer is given a cross-section approximately in the form of an elongated triangle; a cemented carbide support having, on one face at least, a circumferential chamfer of a shape corresponding to that of the layer is placed on the layer; the annular layer is densified by mechanical pre-compacting; the cell containing the assembly is brought to a temperature exceeding 1200° C. under a pressure exceeding 45 kbar in a press and the cell is maintained at these temperature and pressure for a sufficient time to cause formation of a compact and of a metallurgical bond between the compact and the support.

To improve the bond between the polycrystalline compact and the support, a layer may be inserted therebetween forming a diffusion barrier and/or a thin film of a metal used as catalyst binder (for example cobalt or nickel/chromium). In addition, in order to avoid diffusion of the binder contained in the carbide. when a compact is used having a thermostable binder, it is advantageous to provide at the interface a layer of a refractory metal such as tungstene for example. In this case, the method described in European patent application No. 0,246,118 may in particular be used.

The invention will be better understood from the following description of particular embodiments, given by way of non-limitative examples.

BRIEF DESCRIPTION OF THE DRAWINGS

FIGS. 1 and 2 show schematically, in elevation with part cut away, the construction of two products in accordance with the invention, intended respectively to form a drilling insert and a cutting tool element;

FIG. 3 shows schematically the positioning of the components for forming a product of the kind shown in FIG. 1 for manufacture;

FIG. 4, similar to FIG. 2, shows an abrasive product which can be used as a cutting tool element, forming a modified embodiment of the invention;

FIG. 5, similar to FIG. 4, shows yet another modification; and

FIG. 6, similar to FIG. 3, corresponds to the manufacture of a product of the kind shown in FIG. 5.

DETAILED DESCRIPTION OF PREFERRED EMBODIMENTS

The composite products shown in FIGS. 1 and 2 both comprise a support 10 of sintered refractory carbide, which will be assumed to contain cobalt as a sintering binder, and a compacts 12 of ultra-hard product having a metallurgical connection with the support. The ultra-hard product may particularly contain 80 to 95% by volume of diamond grains, bonded together directly by bridges. The empty spaces between the diamond grains are occupied by a binder phase which may be an element of the iron group known for its catalyst properties or, particularly when it is desired to obtain a thermostable product, compounds such as those described in document EP-A-0,246,188 already mentioned. The ultra-hard product may be cubic boron nitride (CBN) in substitution for diamond. The binder used in this case has an aluminium base, such as for example the binder described in document EP-A-0,181,258.

According to the invention, compact 12 is in the form of a ring with a triangular cross-section whose degree of elongation in the radial direction is selected particularly as a function of the use for which the product is intended. When it is intended to form a drilling insert (FIG. 1), the width of the ring will be a significant fraction of the radius of the product. In this case, the product will generally be used until there is considerable conical wear. Often, when a central hole 16 is required for passing a fixing bolt therethrough on a tool-holder such as a coalcutter or for allowing a cooling fluid to flow therethrough, the hole may occupy the whole of the radial space inside the annular compact. When the product is intended to be secured onto a machining tool-holder, the width of the ring and the degree of radial extension of the cross-section will in general be smaller (FIG. 2). The central hole 16, if it is provided, may leave a visible annular zone of the support on the face terminating in the cutting edge 18.

The following non-limitative examples correspond to products which have been manufactured and tested with good results.

EXAMPLE 1

A drilling insert of the kind shown in FIG. 1, having the following characteristics, was made:
Diameter: 19.05 mm
Height: 5 mm
Compact: of triangular section having a height of 1 mm and a width of 7 mm,
Support: tungsten carbide with an 8° chamfer.

To manufacture this insert, a layer 22 of a mixture formed of 92% by volume of diamond particles having a grain size between 12 and 22 $\mu$m and 8% of cobalt powder is placed at the periphery of the bottom of a molybdenum cup 20 (FIG. 3). On this layer is placed the support, formed by a stud 24 in the form of a chamfered cylinder, obtained by sintering of a mixture of 89% by weight of tungsten carbide having a grain size of about 5 $\mu$m and 11% cobalt. Stud 24 is pressed on the active part 22 so as to densify the powder layer between the chamfer and the wall of the cup. Cup 20, sealingly closed by a lid 26, is brought to 55 Kbars and 1500° C. for 4 mn to sinter the diamond, the pressure being maintained curing the temperature rise and fall. The cup is removed. The faces are ground and the composite product is trued. For a particular application, a central hole 16, of a diameter substantially equal to the internal diameter of the compact, was formed by electric discharge machining.

EXAMPLE 2

The same method as in Example 1 is used, except that a cobalt film 40 $\mu$m thickis disposed on the face of the stud in contact with the diamond powder. The degree of stress, evaluated by measuring the flatness of the annular "table" of the compact before and after cutting of the support in mid-height, is considerably reduced as compared with that of Example 1.

EXAMPLE 3

The same method as in Example 1 is used, except that:
layer 22 is formed of diamond particles of 10 to 60 $\mu$m, with a mean size of 40 $\mu$m;
a film for forming a diffusion barrier, 150 $\mu$m thick, formed by a mixture of 50% by volume of electromelted WC powder of a diameter of 80 $\mu$m and 50% by volume of diamond powder of 40 to 60 $\mu$m is interposed between layer 22 and pin 24.

No stripping of layers, no cracking was observed after the composite product had been subjected to a rapid heat gradient from 0° to 740° C., then air cooling.

EXAMPLE 4

A composite product intended to form a cutting plate was manufactured using the same process as in Example 1 with the following modifications:
Support forming stud:

Tungsten carbide cylinder, formed from 3 μm particles, with 8% cobalt wt., having, after shaping, a diameter of 13.05 mm and a chamfer at 14° giving a cutting height of 0.7 mm and a width of 2.8 mm for the compact.

Compact forming layer: 89% by volume of diamond powder of 5 to 8 μm and 11% cobalt.

Sintering at 57 kbar and 1550° C. for 3.5 mn.

The composite blank obtained by the method was cut by electro-erosion, then sharpened so as to give a plate of the kind shown in FIG. 4. It can be seen that only the four cutting edges are covered with sintered diamond, which results in a gain in shaping time (sharping) and rapid boring by electro-erosion through the carbide alone.

EXAMPLE 5

A composite product formed of a CBN compact on a carbide support intended to form a double face cutting tool (FIG. 5) was formed by a method similar to that of Example 1.

As shown in FIG. 5, two layers 22 and 30 of powder containing ultra-hard product are placed in the molybdenum cup 20, on each side of the sintered tungsten carbide disk 24 containing cobalt as a binder, chamfered on both sides. Between disk 24 and the layers are placed two tungsten foils 32, covered with a thin carbon coating on the faces in contact with the disk. Layers 22 and 30 are formed of a mixture of CBN powder having a grain size of 1 to 30 μm, containing 10% by volume of a binder consisting of aluminium, silicon and carbon. Sintering is carried out at 55 kbar and 1450° C. for 5 mn.

The advantage of this type of tool, which can also be made with diamond, is that it has two cutting faces, allows boring by electro-erosion (EDM) and gains time in sharpening and grinding because of the reduction of the amount of CBN.

Numerous embodiments are further possible, using solutions making it possible to obtain thermostable products. It should in particular be noted that the catalyst binder of the ultra-hard product may be either mixed with the particles of the product, or deposited previously in the support. In the case of crystalline diamond on a WC support, the binder may be infiltrated from the support. It is also possible to adopt a cross-section of the compact which is not exactly in the form of a triangle but is approximately so.

In general, the angle of the chamfer (and so of the cross-section of the compact) will be between 3° and 15° in the case of an insert, and from 8° to 25° in the case of a machining tool.

I claim:

1. Composite abrasive product comprising a refractory carbide support having an axis and a ring-shaped compact having a rotational symmetry about said axis, having an axial thickness which is small as compared with the axial thickness of the support and having a substantially triangular axial cross-section, said compact having a face metallurgically bonded to a chamfered circumferential part of the support and the two remaining faces joining at a cutting edge.

2. Composite abrasive product according to claim 1, wherein the ring-shaped annular compact is in the form of an annulus and constitutes a major flat surface of the product.

3. Composite abrasive product according to claim 1, wherein said triangular cross-section is elongated radially.

4. Composite abrasive product according to claim 1, wherein said triangular cross-section has an apex angle of from 3° to 45°.

5. Composite abrasive product according to claim 1, wherein said support has a compact on each of the two major end faces thereof.

6. Composite abrasive product according to claim 1, formed with an axial hole passing only through said support.

7. Composite abrasive product comprising a prism-shaped refractory carbide support having an axis and a compact having a rotational symmetry about the axis, an axial thickness which is small as compared with the axial thickness of the support and a substantially triangular axial cross-section, one of the faces of the compact having a metallurgical bond with a chamfered circumferential part of the support while the other faces of the compact are joined at a cutting edge, said compact consisting of a plurality of portions each representing fractions of a ring and occupying projecting portions of said support.

8. Method of manufacturing an abrasive product, comprising the steps of:

placing an annular layer of a powder of the product intended to form the abrasive contact at the periphery of the bottom of a cup, while giving to the layer a cross-section approximately in the form of an elongated triangle;

placing, on the layer, a cemented carbide support having, on one face at least, a circumferential chamfer of a shape corresponding to that of the layer;

densifying the annular layer by mechanical pre-compacting;

bringing the cell containing the assembly to a temperature exceeding 1200° C. at a pressure exceeding 45 kbar in a press and maintaining the cell at these temperature and pressure for a time sufficient to cause the formation of the compact and a metallurgical bond between the compact and the support.

9. Method according to claim 8, comprising the additional step of placing a layer forming a diffusion barrier and a thin film of a catalyst metal between said powder and the support.

10. Method according to claim 8, including the further step of inserting a refractory metal layer preventing diffusion of the binder from the support towards the compact between the powder and the support.

11. Cylindrical composite abrasive product having two flat surfaces, comprising a refractory carbide support having an axis and a ring-shaped compact having a polycrystalline structure and containing grains of ultra-hard material bonded directly together, said ring-shaped compact having a rotational symmetry about said axis, having an axial thickness which is small as compared with the axial thickness of the support, having a substantially triangular axial cross-section, having a face metallurgically bonded to a chamfered circumferential part of the support while the two remaining faces thereof join at a circumferential cutting edge of one of the flat surfaces.

12. Composite abrasive product according to claim 11, wherein said ring-shaped compact constitues at least a major portion of said one flat surface of the product.

13. Composite abrasive product according to claim 11, formed with a cylindrical axial hole so sized with respect to said compact to pass through said support only.

* * * * *